(12) United States Patent
Anderson et al.

(10) Patent No.: US 12,017,147 B2
(45) Date of Patent: Jun. 25, 2024

(54) GAME PLAYER CREATED OBJECT AND VIDEO GAME PLAY

(71) Applicant: Activision Publishing, Inc., Santa Monica, CA (US)

(72) Inventors: Jeremy Noah Anderson, Sherman Oaks, CA (US); Jack James Kleckner, Beverly Hills, CA (US); Todd Leonard Mueller, Van Nuys, CA (US); Misty Alexandrea Yousser Noor, Los Angeles, CA (US); Benjamin Scott Perry, North Hollywood, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 18/117,940

(22) Filed: Mar. 6, 2023

(65) Prior Publication Data
US 2023/0226448 A1    Jul. 20, 2023

Related U.S. Application Data

(63) Continuation of application No. 17/116,307, filed on Dec. 9, 2020, now abandoned.
(Continued)

(51) Int. Cl.
*A63F 13/65* (2014.01)
*A63F 13/213* (2014.01)
(Continued)

(52) U.S. Cl.
CPC ............ *A63F 13/65* (2014.09); *A63F 13/213* (2014.09); *A63F 13/537* (2014.09); *A63F 13/92* (2014.09);
(Continued)

(58) Field of Classification Search
CPC . G06T 19/006; G06K 9/00671; A63F 13/213; A63F 13/537; A63F 13/65; A63F 13/92; A63F 13/98
See application file for complete search history.

(56) References Cited

U.S. PATENT DOCUMENTS 5,853,327 A * 12/1998 Gilboa ..................... A63F 13/26
273/237
7,397,464 B1 * 7/2008 Robbins ................ G06F 3/0425
345/173
(Continued)

OTHER PUBLICATIONS

Glen Tickle, "A Smartphone Game That Lets Players Send Virtual Paper Airplanes Around the World," Oct. 4, 2016, laughingsquid.comhttps://paperplanes.world/, (at https://laughingsquid.com/a-smartphone-game-that-lets-players-send-virtual-paper-airplanes-around-the-world), last visited Jul. 7, 2023. (Year: 2016).*

*Primary Examiner* — Steve Rowland
(74) *Attorney, Agent, or Firm* — RAY QUINNEY & NEBEKER P.C.; John O. Carpenter

(57) ABSTRACT

A video game may include a virtual representation of a game player created object. The game player created object may be imaged by an imaging device of a smartphone, with the smartphone determining a virtual representation for use in the video game based on information of the image. In some embodiments the game player may control the virtual representation during game play. In some embodiments the game player created object may be an origami object.

9 Claims, 9 Drawing Sheets

Related U.S. Application Data

(60) Provisional application No. 62/945,744, filed on Dec. 9, 2019.

(51) Int. Cl.
  *A63F 13/537* (2014.01)
  *A63F 13/92* (2014.01)
  *A63F 13/98* (2014.01)
  *G06T 19/00* (2011.01)
  *G06V 20/20* (2022.01)

(52) U.S. Cl.
  CPC ............ *A63F 13/98* (2014.09); *G06T 19/006* (2013.01); *G06V 20/20* (2022.01)

(56) References Cited

U.S. PATENT DOCUMENTS

| | | | | |
|---|---|---|---|---|
| 11,696,353 | B2* | 7/2023 | Park | H04W 76/15 370/329 |
| 2004/0087355 | A1* | 5/2004 | Toyoda | G07F 17/3211 463/16 |
| 2004/0092311 | A1* | 5/2004 | Weston | A63F 13/71 463/43 |
| 2005/0059483 | A1* | 3/2005 | Borge | A63F 13/69 463/29 |
| 2005/0266907 | A1* | 12/2005 | Weston | A63F 13/48 463/1 |
| 2006/0019746 | A1* | 1/2006 | Seelig | G07F 17/323 463/30 |
| 2006/0154726 | A1* | 7/2006 | Weston | A63F 13/90 463/36 |
| 2007/0167239 | A1* | 7/2007 | O'Rourke | G07F 17/32 463/42 |
| 2007/0211047 | A1* | 9/2007 | Doan | G06F 3/0393 345/419 |
| 2009/0005167 | A1* | 1/2009 | Arrasvuori | H04M 1/72427 463/40 |
| 2009/0007186 | A1* | 1/2009 | Hartwell | A63F 13/35 725/62 |
| 2009/0197658 | A1* | 8/2009 | Polchin | A63F 13/245 463/9 |
| 2010/0240458 | A1* | 9/2010 | Gaiba | G06F 3/015 463/36 |
| 2011/0014975 | A1* | 1/2011 | Grabiec | G07F 17/34 463/31 |
| 2011/0098092 | A1* | 4/2011 | Reiche, III | A63F 13/235 463/30 |
| 2014/0256389 | A1* | 9/2014 | Wentling | A63F 13/63 463/2 |
| 2016/0147404 | A1* | 5/2016 | Keune | G06F 3/0485 715/784 |
| 2019/0188892 | A1* | 6/2019 | Wong | A63F 13/69 |
| 2021/0132683 | A1* | 5/2021 | Herling | G02B 27/0093 |

* cited by examiner

GAME PLAYER CREATED OBJECT AND VIDEO GAME PLAY

CROSS REFERENCE TO RELATED APPLICATIONS

This application is a continuation of U.S. patent application Ser. No. 17/116,307, filed on Dec. 9, 2020, which claims the benefit of the filing date of U.S. Provisional Patent Application No. 62/945,744, filed on Dec. 9, 2019, the disclosures of each of which are incorporated by reference herein.

BACKGROUND OF THE INVENTION

The present invention generally relates to video games, and more particularly to video games with game play that makes use of real world objects.

Video games provide fun and enjoyment for many. Video games allow game players to participate in a variety of simulated activities, including those that the game players may not be able to experience directly, whether due to cost, danger, or equipment concerns, or simply due to an activity being a fantasy activity.

Video games are generally provided by way of electronic devices and associated displays. With play of video games being experienced through the electronic devices, a link between the virtual world of game play and the real world may be attenuated. Moreover, for many video game players, the virtual equipment which may be operated and the various virtual objects encountered during game play may not be items which the video game players have experience or contact in the real world. A dearth of real world connection with the virtual world may serve to decrease enjoyment of video game play.

BRIEF SUMMARY OF THE INVENTION

Some embodiments provide for use in play of a video game of a virtual representation of a game player created object. In some embodiments play of the video game is provided on a portable electronic device. In some embodiments the portable electronic device is a smartphone. In some embodiments the game player created object is paper folded into a shape representational of a real world object. In some embodiments the game player created object may be one of a plurality of predefined objects, with each of the plurality of predefined objects having an associated virtual representation. In some embodiments instructions for generating the game player created object are provided. In some embodiments the instructions for generating the game player created object are provided by the smartphone. In some embodiments image information of the game player created object is compared with information of the plurality of predefined objects, with a particular one of the plurality of predefined objects, and/or the associated virtual representation for the particular one of the plurality of predefined objects, selected based on a correspondence with the image information. In some embodiments the image information is generated by the smartphone. In some embodiments the image information is compared with the information of the plurality of predefined objects using photogrammetry techniques. In some embodiments the associated virtual representation is used in play of the video game. In some embodiments the associated virtual representation is controlled by a game player during play of the video game. In some embodiments the associated virtual representation performs actions in a virtual world of video game play based on inputs to the portable electronic device and/or information from sensors of the portable electronic device.

Some embodiments provide a method of providing for video game play using a virtual representation of a game player created object, comprising: receiving information of an image of the game player created object; using, by at least one processor, the information of the image of the game player created object to determine a virtual representation of the game player created object; and providing for video game play with game player control of the virtual representation of the game player created object. In some embodiments at least some of the information of the image of the game player created object is generated by an imaging device of a portable electronic device. In some embodiments the providing for video game play is provided by the portable electronic device. In some embodiments the at least one processor is a processor of the portable electronic device. In some embodiments the game player control of the virtual representation of the game player created object comprises having the virtual representation perform actions in a virtual world of video game play based on inputs to the portable electronic device and/or information from sensors of the portable electronic device. Some embodiments further provide for presenting instructions for creation of the game player created object by the portable electronic device. In some embodiments the information of the image of the game player created object is compared with information of a plurality of predefined objects, each of the predefined objects associated with a different virtual representation, in determining the virtual representation of the game player created object. In some embodiments the game player created object comprises at least one sheet of folded paper. In some embodiments the game player created object comprises a paper airplane. Some embodiments further provide for: receiving information of an image of a further game player created object; using, by the at least one processor, the information of the image of the further game player created object to determine a virtual representation of the further game player created object; and modifying characteristics of the virtual representation of the game player created object based on the virtual representation of the further game player created object.

Some embodiments provide a non-transitory computer readable memory storing program instructions, the program instructions comprising program instructions to configure at least one processor to: receive information of an image of the game player created object; use the information of the image of the game player created object to determine a virtual representation of the game player created object; and provide for video game play with game player control of the virtual representation of the game player created object.

These and other aspects of the invention are more fully comprehended upon review of this disclosure.

DETAILED DESCRIPTION

Figure 1:
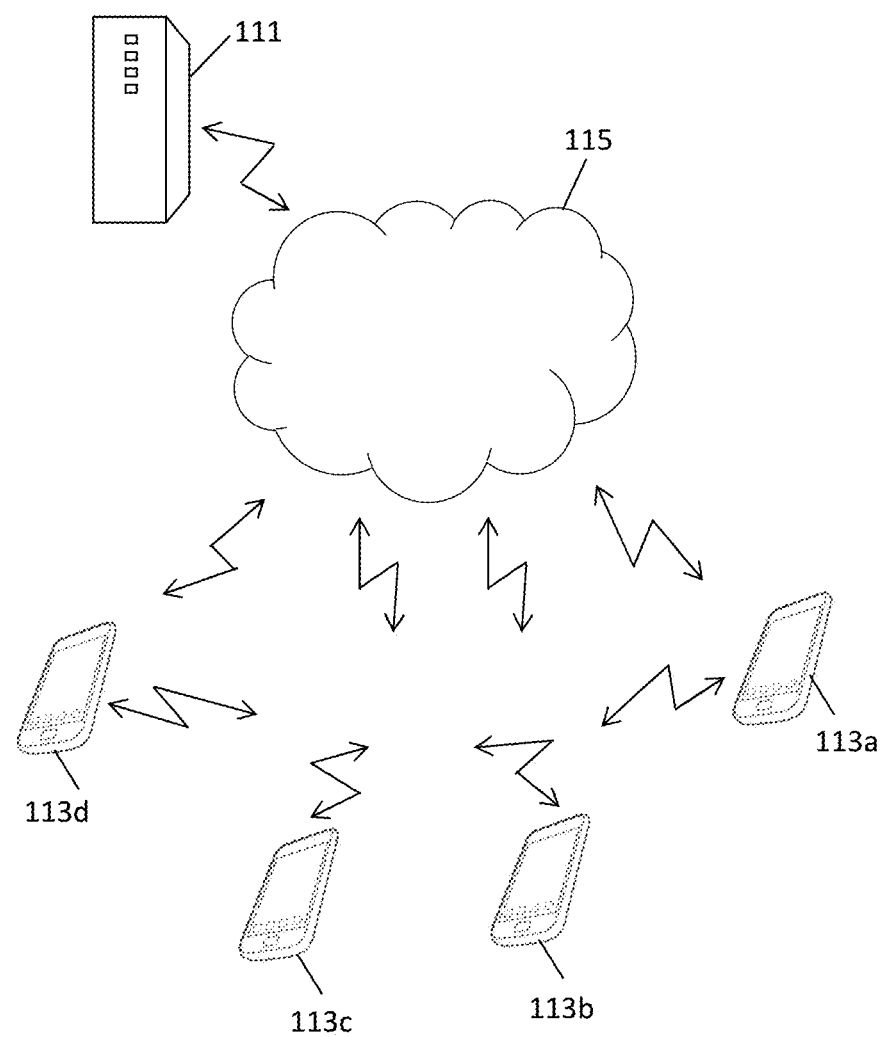
FIG. 1 is a semi-block diagram of a networked system, including portable electronic devices, in accordance with aspects of the invention.

FIG. 1 is a semi-block diagram of a networked system, including portable electronic devices, in accordance with aspects of the invention. The networked system includes a server 111 and a plurality of portable electronic devices 113a-d communicatively coupled to each other by a network 115, which may be the Internet. The portable electronic devices are also in data communication with one another, and in some embodiments may form a local network. In some embodiments the local network may also include a router or hub.

The portable electronic devices provide for play of a video game. In some embodiments the portable electronic devices each provide for play of their own stand-alone game, in some embodiments the portable electronic devices provide for networked play of a common game. In some embodiments the portable electronic devices provide for control of a virtual representation of an object in a virtual world of game play, based on user inputs to the devices and/or user manipulation of the devices in space. In some embodiments the virtual representation of the object is a virtual representation of a game player created object. In some embodiments the game player created object is paper folded into a shape representational of a real world object. In some embodiments the paper is folded into a shape representational of an airplane. In some embodiments the paper is folded into a shape of a paper airplane. In some embodiments the devices determine features of the game player created object based on image analysis of an image of the game player created object. In some embodiments the devices determine a virtual representation to be used in the video game by correlating determined features of the image of the game player created object with features of predetermined virtual representations.

In some embodiments the portable electronic devices each include at least one processor, a display, at least one user input device, at least one motion-related sensor, an imaging device, and, in various embodiments communication circuitry, generally all coupled to a frame or within bounds of the frame. In some embodiments the portable electronic devices also include a microphone. In various embodiments the portable electronic devices comprise smartphones. In some embodiments the at least one user input device comprises a touchscreen. In some embodiments the at least one motion-related sensor comprises at least one accelerometer, with many embodiments including a plurality of accelerometers, in some embodiments the at least one motion related sensor comprises at least one gyroscope, and in some embodiments the at least one motion related sensor comprises both accelerometer(s) and gyroscope(s).

In some embodiments the imaging device forms an image of a game player created object. In some embodiments the processor, for example as configured by program instructions, provides for play of a video game, including controlling actions of a virtual representation of an object representing the game player created object based on inputs received by the touchscreen and/or information from the at least one motion-related sensor. In some embodiments the processor determines the virtual representation of the object based on information of the image of the game player created object. In some embodiments the processor does so using photogrammetry techniques. In some embodiments the processor determines a shape of the game player created object based on information of the image, compares the shape with a plurality of predefined shapes, determines which of the plurality of predefined shapes is closest to the shape of the game player created object, and selects a virtual representation of an object associated with the shape of the plurality of predefined shapes that is closest to the shape of the game player created object. In some embodiments the processor commands transmission of information of the image to the server. In such embodiments, the server may perform analysis of the image and selection of a virtual representation of an object based on the analysis of the image, with the server transmitting information of the virtual representation of the object to the portable electronic device including the processor.

Figure 2:
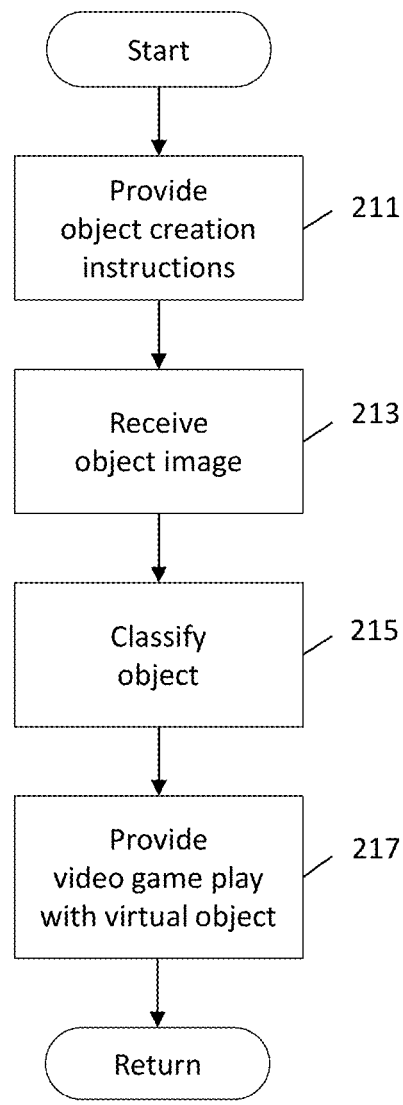
FIG. 2 is a flow diagram of a process for providing for use in play of a video game of a virtual representation of a game player created object, in accordance with aspects of the invention.

FIG. 2 is a flow diagram of a process for providing for use in play of a video game of a virtual representation of a game player created object, in accordance with aspects of the invention. In some embodiments the process of FIG. 2 is performed by a system, for example the system of FIG. 1. In some embodiments the process is performed by a portable electronic device, for example one of the portable electronic devices of FIG. 1. In some embodiments the process is performed by one or more portable electronic devices, for example one or more of the portable electronic devices of FIG. 1. In some embodiments the process is performed by at least one processor, for example as configured by program instructions.

In block 211, optional in some embodiments, the process provide object creation instructions. In some embodiments the object creation instructions comprise instructions to be used by a game player in create the game player created object. In some embodiments the object creation instructions provide instructions for folding paper to create the game player created object. In some embodiments the object creation instructions provide instructions for folding paper to create a paper airplane. In some embodiments the object creation instructions provide instructions for folding paper into an object representational of a real world object. In some embodiments the object creation instructions are presented by the portable electronic device. In some embodiments the object creation instructions are presented on a display of the portable electronic device. In some embodiments the object creation instructions are presented in audio, visual, or audiovisual form by the portable electronic device.

In block 213 the process receives image information for the game player created object. In some embodiments the game player created object is a game player created object created in accordance with the object creation instructions. In some embodiments the game player created object is representational of a real world object. In some embodiments the game player created object is paper folded into a shape. In some embodiments the game player created object is a paper airplane. In some embodiments the image information is an image formed by the portable electronic device, with in some embodiment the portable electronic device being a smartphone. In some embodiments the image information is received by another device, for example a server, with the image information provided over a network by the portable electronic device, for example.

In block 215 the process determines a virtual representation of an object based on the image information. In some embodiments the virtual representation comprises a two or three dimensional model to be used to visually represent the object during video game play. In some embodiments the virtual representation includes information to be used in displaying the object during video game play, and information relating to capabilities and/or characteristics of the object for video game play. In some embodiments the process uses the image information to classify the game player created object as representative of one of a plurality of real world objects. In some embodiments the process classifies the game player created object as one of a plurality of types of objects. For example, in some embodiments the process classifies the game player created object as one of a paper airplane, a building, an engine, or a tree. Also for example, in some embodiments the process classifies the game player created object as one of a plurality of embodiments of a different paper airplanes. Also for example, in some embodiments the process classifies the game player created object as one of a plurality of different embodiments of a same idealized paper airplane. For example, in some embodiments the process may classify the game player created object somewhat differently based on how closely locations of folds of the paper matches folds as indicated by the object creation instructions and/or quality of the folds.

In some embodiments the process determines the virtual representation based on analysis of information of the image. In some embodiments the analysis utilizes photogrammetry techniques. In some embodiments the process determines a shape of the user created object in the image, and compares the shape to a plurality of predefined shapes. In some embodiments the process performs a transformation of the shape in the image in orientation and/or size so as to orient and/or size the shape in the image to an orientation and/or size of the plurality of predefined shapes. In some embodiments the process determines a shape of the user created object in the image and locations of folds in the image. In some embodiments paper used in creating the user created image includes predetermined markings and/or lines, and in some embodiments the process uses the predetermined markings and/or lines in classifying the game player created object.

In block 217 the process provides for play of a video game in which the virtual representation of the object is controlled by the game player. In some embodiments the virtual representation is in and interacts with characters and objects in a virtual world of video game play. In some embodiments the virtual representation performs actions in a virtual world of video game play based on inputs to the portable electronic device and/or information from sensors of the portable electronic device. In some embodiments the virtual representation is a virtual airplane. In some embodiments the virtual representation moves in the virtual world in a manner corresponding to movement of the portable electronic device in the real world. In some embodiments the movement of the portable electronic device is determined based on information from accelerometer(s) and/or gyroscope(s) of the portable electronic device. In some embodiments a velocity of the virtual representation in the virtual world is increased based on an input received by a microphone of the virtual device. In some embodiments the input is a predetermined input. In some embodiments the predetermined input is an input indicative of a blowing on the microphone. In some embodiments the predetermined input is an input about a particular frequency.

The process thereafter returns.

Figure 3:
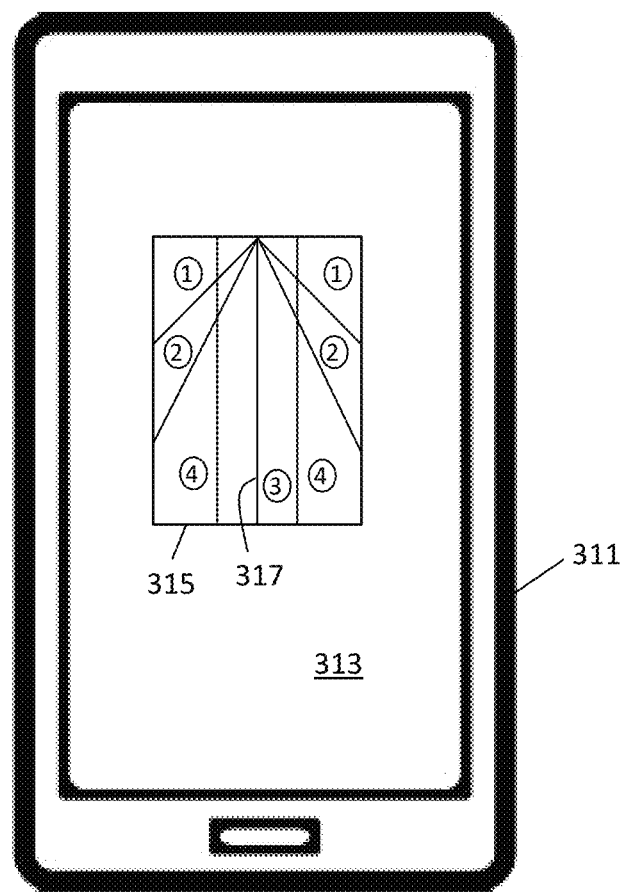
FIG. 3 is a front view of a portable electronic device displaying instructions for generating a game player created object, in accordance with aspects of the invention.

FIG. 3 is a front view of a portable electronic device 311 displaying instructions for generating a game player created object, in accordance with aspects of the invention. In some embodiments the portable electronic device includes one or more processors, a display 313, and an input device in the form of a touchscreen, and an imaging device, for example a camera. In various embodiments the portable device may include wireless communication capabilities, for example cellular and/or Wi-Fi communication capabilities. In some embodiments the portable electronic device additionally includes one or more motion-related sensors, for example one or more accelerometers and/or one or more gyroscopes. In some embodiments the portable electronic device is a smartphone. In some embodiments one or more processors of the smartphone, or of another portable electronic device, is configured, for example by program instructions, to command presentation of instructions for generating a game player created object, store image information in memory of an image of the game player created object, transmit the image information to a server for analysis and/or execute an image analysis program as part of determining a virtual representation for use in play of a video game, and provide for video game play in which a game player is provided control of the virtual representation in a virtual world of game play.

In FIG. 3, the display shows a sheet of paper 315. The displayed sheet of paper may represent, for example, an 8½×11 inch sheet of paper, an A4 sheet of paper, or a sheet of paper having some other dimensions. A plurality of lines are diagrammed on the sheet of paper, for example a line 317 that lengthwise bisects the sheet of paper. The lines may represent locations along which a game player is to fold an actual sheet of paper in creating a game player created object, which in the example of FIG. provides for creation of a paper airplane. Each of the lines includes an associated number, indicating an order in which the folds should be made. For example a number 3 is displayed alongside the line 317, indicating that the fold alongside line 317 should be made after making folds associated with lines having numbers 1 and 2 by the lines, and before making folds associated with lines associated with a number 4.

In various embodiments the display may instead or in addition provide text instructions, instructions that progress over a plurality of displayed pages, instructions in the form of a video or an animation, or other presentation of instructions. In some embodiments the instructions may be provided to the portable electronic device by a server. In some embodiments the instructions may be provided along with program instructions for executing the video game. In some embodiments the instructions may be provided separately from instructions for executing the video game.

Figure 4:
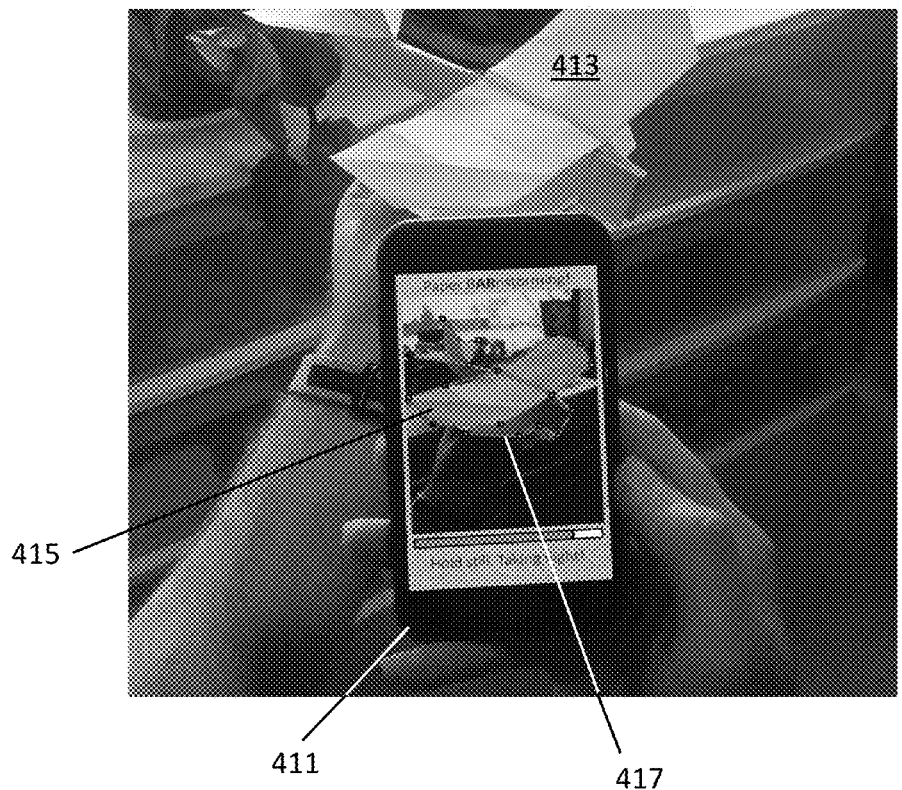
FIG. 4 shows a game player created object, in the form of a paper airplane, and a portable electronic device displaying an image showing the game player created object, in accordance with aspects of the invention.

FIG. 4 shows an example of a game player created object and a portable electronic device displaying an image showing the game player created object, in accordance with aspects of the invention. The game player created object in FIG. 4 is a paper airplane 413. A portable electronic device, in the form of a smartphone 411, displays an image 415 of the paper airplane. The smartphone and paper airplane are shown in FIG. 4 as having relative positions such that an imaging device of the smartphone, for example a camera, may image the paper airplane.

In FIG. 4, the display of the smartphone also shows an outline 417 of the paper airplane, with the outline also indicating at least some folds in a sheet of paper used in forming the paper airplane. In some embodiments the outline may be used by the processor of the smartphone, or a server, in determining a virtual representation for use in video game play. In some embodiments the outline may be determined based on differences in gray scale levels of pixels of the image captured by the smartphone camera, for example. In some embodiments the outline may be formed, at least in part, through a game player providing touchscreen inputs at locations of edges of the paper airplane. In some embodiments the smartphone may perform a transformation of information of the image of the paper airplane, for example a transformation of the outline of the paper airplane, so as to orient and/or size a representation of the paper airplane to a predetermined orientation and/or size to facilitate comparisons with information of stored representations of various objects.

Figure 5:
FIG. 5 illustrates a screenshot from play of a video game illustrating use of a virtual representation of an airplane.

FIG. 5 illustrates a screenshot from play of a video game illustrating use of a virtual representation of an airplane. The screenshot may be of a display of a portable electronic device, for example as discussed with respect to FIG. 1 or FIG. 4.

In the screenshot, a plane 511 is shown approaching a structure 513 in a virtual world of video game play. The plane may be a virtual representation of a paper airplane created by the game player. Similarly, the structure, in the form of a barn, may also be a virtual representation of a crafts item created by the game player, with the crafts item also in the form of a barn. The screenshot of FIG. 5 may be considered to display the virtual world in a two-dimensional display. In various embodiments, however, the virtual world, and the objects within the virtual world, may be provided in what may be considered a view of a three-dimensional space.

The plane may be under the control of a game player. In some embodiments the game player may control movement of the plane by providing inputs to the portable electronic device and/or moving the portable electronic device through space to modify outputs of motion-related sensors of the portable electronic device.

Figure 6:
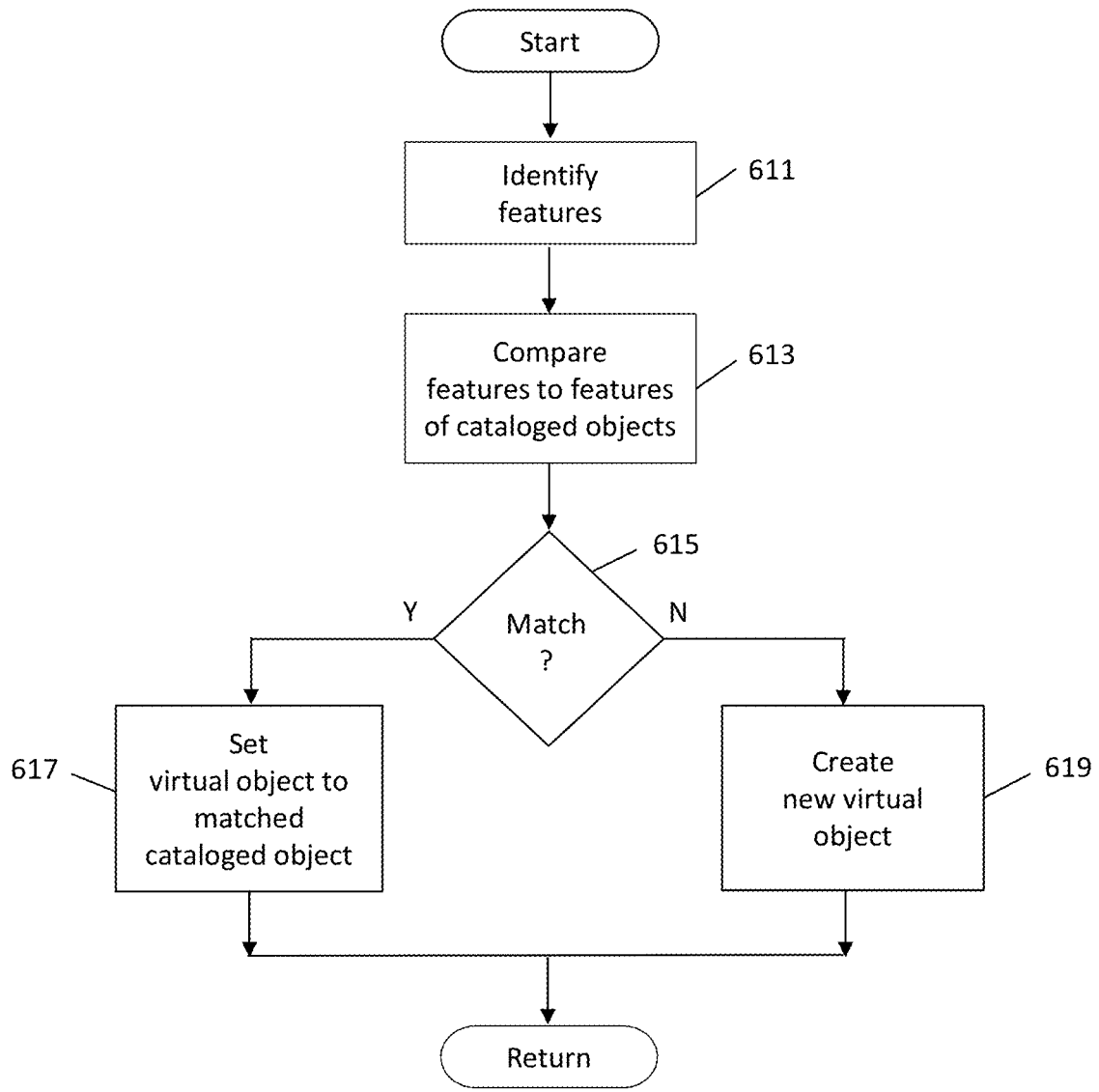
FIG. 6 is a flow diagram of a process for determining a virtual representation of an object for use in a video game based on features of a game player created object, in accordance with aspects of the invention.

FIG. 6 is a flow diagram of a process for determining a virtual representation of an object for use in a video game based on features of a game player created object, in accordance with aspects of the invention. In some embodiments the process of FIG. 2 is performed by a system, for example the system of FIG. 1. In some embodiments the process is performed by a portable electronic device, for example one of the portable electronic devices of FIG. 1. In some embodiments the process is performed by one or more portable electronic devices, for example one or more of the portable electronic devices of FIG. 1. In some embodiments the process is performed by at least one processor, for example as configured by program instructions. In some embodiments the process performs operations of block 215 of the process of FIG. 2.

In block 611 the process identifies features in an image of a game player created object. In some embodiments the image is an image taken by the portable electronic device, which may be a smartphone in some embodiments. In some embodiments the game player created object is one or more sheet of papers folded into a representation of a real world object. In some embodiments the game player created object is a paper airplane. In some embodiments the identified features comprise an outline of the game player created object. In some embodiments the identified features comprise a shape of the game player created object. In some embodiments the identified features comprise visible folds of the game player created object. In some embodiments the identified features are identified using photogrammetry techniques. In some embodiments the identified features are identified by comparing gray levels of adjacent pixels in the image.

In block 613 the process compares the identified features in the image with features of predefined objects. In some embodiments the predefined objects comprise a plurality of real world objects. In some embodiments the predefined objects comprise a plurality of types of real world objects. In some embodiments the predefined objects comprise a plurality of real world objects of the same type, for example airplanes or paper airplanes. In some embodiments the process performs a mathematical transformation of the identified features or the features of the predefined objects in order to perform the comparisons.

In block 615 the process determines if there is a match between the identified features of the image of the game player created object and the features of any of the predefined objects. If so, the process proceeds to block 617, otherwise the process proceeds to block 619.

In block 617 the process sets a virtual representation of an object to be used in play of a video game to a virtual representation associated with the matched predefined object. In some embodiments the virtual representation comprises a two or three dimensional model to be used to visually represent the object during video game play. In some embodiments the virtual representation includes information to be used in displaying the object during video game play, and information relating to capabilities and/or characteristics of the object for video game play. The process thereafter returns.

In block 619 the process creates a new virtual representation of an object to be used in play of the video game. In some embodiments the new virtual representation comprises a two or three dimensional model, with features similar to those of the image of the game player created object. In some embodiments the virtual representation includes default information to be used in displaying the object during video game play, and default information relating to capabilities and/or characteristics of the object for video game play.

Figure 7:
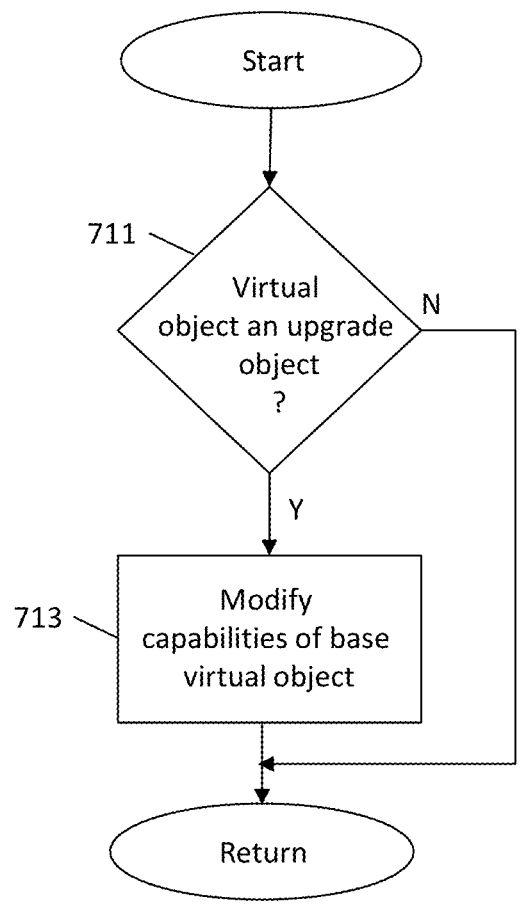
FIG. 7 is a flow diagram a process for determining if characteristics of a first virtual representation of a first object should be modified based on aspects of a second virtual representation of a second object, in accordance with aspects of the invention.

FIG. 7 is a flow diagram a process for determining if characteristics of a first virtual representation of a first object should be modified based on aspects of a second virtual representation of a second object, in accordance with aspects of the invention. In some embodiments the process of FIG. 2 is performed by a system, for example the system of FIG. 1. In some embodiments the process is performed by a portable electronic device, for example one of the portable electronic devices of FIG. 1. In some embodiments the process is performed by one or more portable electronic devices, for example one or more of the portable electronic devices of FIG. 1. In some embodiments the process is performed by at least one processor, for example as configured by program instructions.

In block 711, the process determines if a virtual object is an upgrade object. In some embodiments the process determines that the virtual object as an upgrade object if a virtual representation of a game player created object is already being used or is available for use in play of a video game. In some embodiments the process determines the virtual object is an upgrade object if the virtual object is classified as an upgrade object. For example, in some embodiments the process classifies an engine, a propeller, or a weapon as an upgrade object, but does not classify a plane as an upgrade object. In some embodiments the upgrade object is an additional virtual structure or a cosmetic modification to a base object. In some embodiments the upgrade object is a virtual performance upgrade enhancing statistics of the base object. In some embodiments the upgrade is both a virtual structure upgrade and a performance upgrade. If the process determines the virtual object is not an upgrade object, the process returns. Otherwise, the process continues to block 713.

In block 713, the process modifies characteristics of a virtual representation of a game player created object based on aspects of the upgrade object determined in block 711. For example, in some embodiments the process may upgrade or modify speed, handling, stunt or trick capabilities, launch equipment, landing equipment, or noise of an airplane virtual representation of the game player created object. In other embodiments the process may upgrade or modify damage, accuracy, weight, fire rate, or range of a weapon of the virtual representation of the game player created object.

The process thereafter returns.

Figure 8:
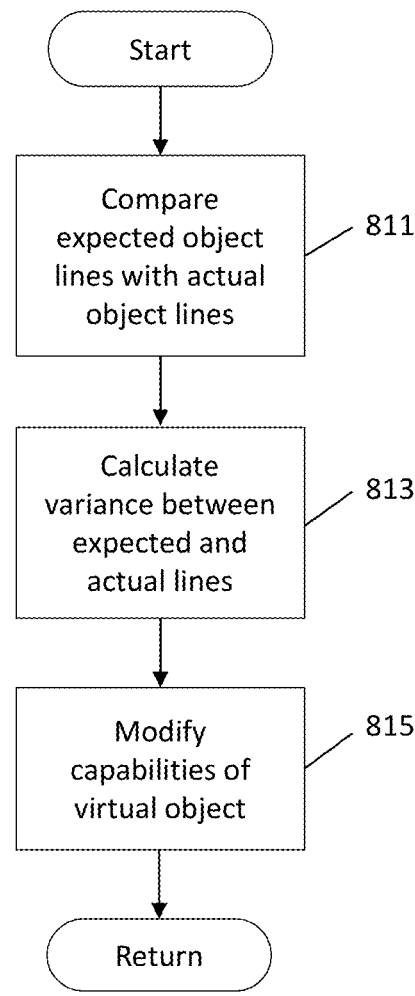
FIG. 8 is a flow diagram of a process for determining modifications of characteristics of a virtual representation based on extent of conformance with standards for a game player created object, in accordance with aspects of the invention.

FIG. 8 is a flow diagram of a process for determining modifications of characteristics of a virtual representation based on extent of conformance with standards for a game player created object, in accordance with aspects of the invention. In some embodiments the process of FIG. 2 is performed by a system, for example the system of FIG. 1. In some embodiments the process is performed by a portable electronic device, for example one of the portable electronic devices of FIG. 1. In some embodiments the process is performed by one or more portable electronic devices, for example one or more of the portable electronic devices of FIG. 1. In some embodiments the process is performed by at least one processor, for example as configured by program instructions. In some embodiments the process of FIG. 8 is used as part of operations of block 215 of the process of FIG. 2 and/or as part of operations of block 617 of the process of FIG. 6.

In block 811 the process compares lines in an image of a game player created object with lines for a predefined standard model for the object. In some embodiments the lines in the image of the game player created object are lines formed by folds in a folded sheet of paper forming the game player created object. In some embodiments the lines in the image of the game player created object are lines forming an outline of the game player created object. In some embodiments the lines for the predefined standard model for the object are lines in accordance with instructions for generating the game player created object. In some embodiments the process compares relative locations of a plurality of lines in the image of the game player created object and relative locations of a corresponding plurality of lines in the standard model of the object. In some embodiments the process compares lengths of lines in the image of the game player created object and lengths of corresponding lines in the standard model of the object.

In block 813 the process determines an extent of variance between the lines in the image of the game player created object and lines for the predefined standard model for the object.

In block 815 the process modifies characteristics of a virtual representation of the game player created object based on the extent of variance between the lines in the image of the game player created object and lines for the predefined standard model for the object. In some embodiments the process degrades characteristics of the virtual representation, for example speed or acceleration capabilities, based on the extent of variance. For example, in some embodiments the process may degrade predetermined characteristics if the extent of variance is greater than a predetermined amount. In some embodiments the process improves characteristics of the virtual representation based on the extent of variance. For example, in some embodiments the process may improve predetermined characteristics if the extent of variance is less than a predetermined amount.

The process thereafter returns.

Figure 9:
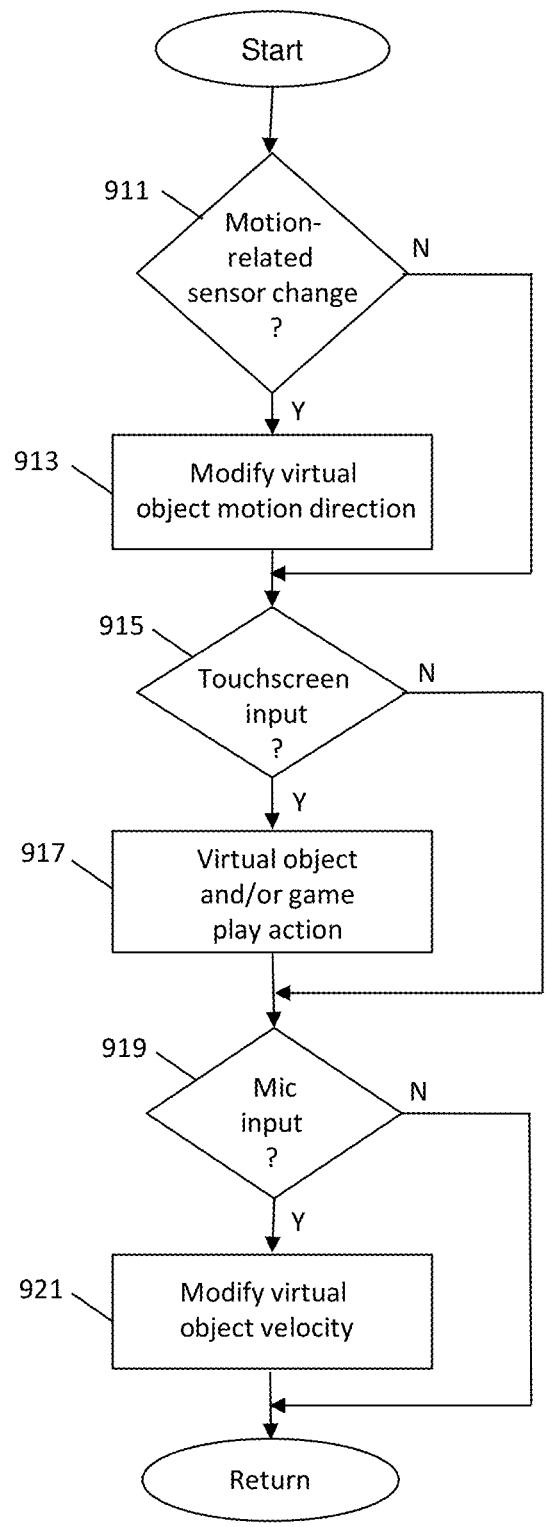
FIG. 9 is a flow diagram of a process for providing for movement of a virtual representation of an object during video game play, in accordance with aspects of the invention.

FIG. 9 is a flow diagram of a process for providing for movement of a virtual representation of an object during video game play, in accordance with aspects of the invention. In some embodiments the process of FIG. 2 is performed by a system, for example the system of FIG. 1. In some embodiments the process is performed by a portable electronic device, for example one of the portable electronic devices of FIG. 1. In some embodiments the process is performed by one or more portable electronic devices, for example one or more of the portable electronic devices of FIG. 1. In some embodiments the process is performed by at least one processor, for example as configured by program instructions. In some embodiments the process of FIG. 9 performs operations of block 217 of the process of FIG. 2.

In block 911, the process determines if a motion-related sensor change has occurred. In some embodiments the motion-related sensor is at least one accelerometer. In some embodiments the motion-related sensor is at least one gyroscope. In some embodiments the motion-related sensor is at least one accelerometer and at least one gyroscope. In some embodiments the at least one accelerometer and/or gyroscope is in a frame of a portable electronic device. In some embodiments the portable electronic device is a portable electronic device of FIG. 1. In some embodiments the motion-related sensor change occurs when the portable electronic device is moved in a predetermined manner, as indicated by the at least one accelerometer and/or at least one gyroscope. In some embodiments the movement is a yawing of the portable electronic device. In some embodiments the movement is a rotation of the portable electronic device. In some embodiments the movement is a pitching of the portable electronic device. In some embodiments the pitching of the portable electronic device is rotation of the portable electronic device by a predetermined number of degrees, or within a predetermined range of predetermined number of degrees. In some embodiments the movement is a rolling of the portable electronic device. In some embodiments the rolling of the portable electronic device is rotation of the portable electronic device by a predetermined number of degrees, or within a predetermined range of predetermined number of degrees. In some embodiments the movement is a linear translation of the portable electronic device. In some of such embodiments the linear translation is to the right of an initial position. In some of such embodiments the linear translation is to the left of the initial position. In some of such embodiments the linear translation is to the forward of an initial position.

If a motion-related sensor change has occurred, the process continues to block 913. Otherwise, the process continues to block 915.

In block 913, the process modifies motion of a virtual representation of a game player created object based on the motion-related sensor change. In some embodiments the virtual representation is an airplane. In some embodiments if the motion-related sensor indicates a yaw, pitch, and/or roll, the process yaws, pitches, and/or rolls the virtual representation, respectively. In some embodiments the process applies a degree of yaw, pitch, and roll to the virtual representation based on a yaw, pitch, and/or roll indicated by the motion-related sensor. In some embodiments if the motion-related sensor indicates a linear translation of the portable electronic device, the process moves the virtual representation in a direction of linear translation of the portable electronic device. In some embodiments if the motion-related sensor indicates a linear translation to the forward of an initial position of the portable electronic device, the process launches the virtual representation into the virtual air.

In block 915, the process determines if a touchscreen input is received. In some embodiments the touchscreen is attached to the frame of a portable electronic device. In some embodiments the portable electronic device is a portable electronic device of FIG. 1. In some embodiments the touchscreen input is a swipe. In some embodiments the touchscreen input is a drag. In some embodiments the touchscreen input is a press. In some embodiments the press is a short press lasting less than 1 second. In some embodiments the press is a long press lasting more than 1 second. In some embodiments the pressing or swiping medium is a user's finger. In some embodiments the pressing or swiping medium is a stylus. In some embodiments the touchscreen input is received on a virtual D-pad and/or at least one button.

If a touchscreen input is received, the process continues to block 917. Otherwise, the process continues to block 919.

In block 917, the process translates touchscreen input into virtual object and/or game play action. For example, in some embodiments a virtual object action and/or gameplay action may be creating a path on a course, launching or throwing a virtual representation of the game player created object, controlling the yaw, pitch, or roll of the virtual representation of the game player created object, performing a stunt with a virtual representation of the game player created object, firing a virtual weapon, or dropping virtual cargo from the virtual representation of the game player created object. In some embodiments paths may be inputted on the touchscreen by following a swipe, a button press, or by dragging and dropping a path onto an area of a virtual world. In some embodiments, the virtual paper airplane.

In block 919, the process determines if a microphone input is received. In some embodiments the microphone is in a frame of a portable electronic device. In some embodiments the portable electronic device is a portable electronic device of FIG. 1. In some embodiments a microphone input is only considered to be received if the microphone input meets predetermined criteria. For example, in some embodiments the predetermined criteria may be criteria indicative of the microphone being blown upon.

If a microphone input is received, the process continues to block 921. Otherwise, the process returns.

In block 921, the process modifies a velocity of the virtual representation of the game player created object based on the microphone input. In some embodiments the velocity of the virtual representation of the game player created object increases by a predetermined amount in response to receipt of the microphone input.

The process thereafter returns.

Although the invention has been discussed with respect to various embodiments, it should be recognized that the invention comprises the novel and non-obvious claims supported by this disclosure.

What is claimed is:

1. A method of providing for video game play using a virtual representation of a game player created object, comprising:
   receiving information of an image of the game player created object, the image formed by an imaging device of a portable electronic device;
   using, by at least one processor, the information of the image of the game player created object to determine a virtual representation of the game player created object; and
   providing for video game play with game player control of the virtual representation of the game player created object;
   wherein the game player created object comprises at least one sheet of folded paper.

2. The method of claim 1, wherein the at least one sheet of folded paper comprises a paper airplane.

3. The method of claim 1, wherein the providing for video game play is provided by the portable electronic device.

4. The method of claim 1, further comprising presenting instructions for creation of the game player created object by the portable electronic device.

5. The method of claim 1, wherein the information of the image of the game player created object is compared with information of a plurality of predefined objects, each of the predefined objects associated with a different virtual representation, in determining the virtual representation of the game player created object.

6. The method of claim 1, wherein the at least one processor is a processor of the portable electronic device.

7. The method of claim 1, wherein the game player control of the virtual representation of the game player created object comprises having the virtual representation perform actions in a virtual world of video game play based on inputs to the portable electronic device and/or information from sensors of the portable electronic device.

8. A non-transitory computer readable memory storing program instructions, the program instructions comprising program instructions to configure at least one processor to:
   present instructions for creation of the game player created physical object;
   receive information of an image of the game player created physical object;
   use the information of the image of the game player created physical object to determine a virtual representation of the game player created physical object; and
   provide for video game play with game player control of the virtual representation of the game player created physical object;
   wherein the game player created physical object comprises at least one sheet of folded paper.

9. A non-transitory computer readable memory storing program instructions, the program instructions comprising program instructions to configure at least one processor to:

present instructions for creation of the game player created physical object;
receive information of an image of the game player created physical object;
use the information of the image of the game player created physical object to determine a virtual representation of the game player created physical object; and
provide for video game play with game player control of the virtual representation of the game player created physical object;
wherein the game player created physical object comprises a paper airplane.

* * * * *